(12) United States Patent
Azoulay

(10) Patent No.: US 10,678,780 B2
(45) Date of Patent: Jun. 9, 2020

(54) CROSS VERIFICATION OF DATA CAPTURED BY A CONSUMER ELECTRONIC DEVICE

(71) Applicant: SERELAY LIMITED, London (GB)

(72) Inventor: Roy Azoulay, Oxford (GB)

(73) Assignee: SERELAY LIMITED, London (GB)

( * ) Notice: Subject to any disclaimer, the term of this patent is extended or adjusted under 35 U.S.C. 154(b) by 352 days.

(21) Appl. No.: 15/863,419

(22) Filed: Jan. 5, 2018

(65) Prior Publication Data

US 2018/0189345 A1 Jul. 5, 2018

Related U.S. Application Data

(60) Provisional application No. 62/442,825, filed on Jan. 5, 2017.

(51) Int. Cl.
| | |
|---|---|
| *G06F 7/00* | (2006.01) |
| *G06F 17/30* | (2006.01) |
| *G06F 16/23* | (2019.01) |
| *G06F 16/907* | (2019.01) |
| *G01C 1/00* | (2006.01) |
| *H04W 12/10* | (2009.01) |
| *H04W 12/00* | (2009.01) |
| *H04W 4/02* | (2018.01) |

(52) U.S. Cl.
CPC ........... *G06F 16/2365* (2019.01); *G01C 1/00* (2013.01); *G06F 16/907* (2019.01); *H04W 12/1004* (2019.01); *H04W 4/02* (2013.01); *H04W 12/00502* (2019.01); *H04W 12/00503* (2019.01); *H04W 12/00504* (2019.01); *H04W 12/1006* (2019.01)

(58) Field of Classification Search
CPC ..... G06F 16/29; G06F 16/2365; G06F 16/907
See application file for complete search history.

(56) References Cited

U.S. PATENT DOCUMENTS

| | | | |
|---|---|---|---|
| 7,761,471 B1 * | 7/2010 | Lee | G06F 16/93 707/783 |
| 2007/0049250 A1 * | 3/2007 | Chambers | G06F 21/64 455/411 |
| 2007/0198632 A1 * | 8/2007 | Peart | H04L 12/2812 709/203 |
| 2014/0280103 A1 * | 9/2014 | Harris | G06F 16/487 707/724 |

(Continued)

FOREIGN PATENT DOCUMENTS

WO   WO-2016207899 A1 * 12/2016   ............. G06F 21/64

*Primary Examiner* — Hasanul Mobin
(74) *Attorney, Agent, or Firm* — Fresh IP PLC; Aubrey Y Chen

(57) ABSTRACT

A system for cross verification of data captured by a consumer electronic device is disclosed. Primary data, for example, a photograph, is captured by a mobile capture device, metadata including the time and location of the capture is associated with the primary data. Environmental data, for example, pressure, temperature, visible WiFi networks, visible cell towers, is also measure by the mobile capture device. Other capture devices are identified in the vicinity and those other devices also measure environmental data. The measurements of environmental data can then be compared in order to calculate a confidence level in the position metadata associated with the primary data.

15 Claims, 3 Drawing Sheets

(56) References Cited

U.S. PATENT DOCUMENTS

| | | | |
|---|---|---|---|
| 2015/0026181 A1* | 1/2015 | Milton | G06Q 30/0269 |
| | | | 707/737 |
| 2016/0117923 A1* | 4/2016 | Dannenbring | G06F 16/29 |
| | | | 340/905 |
| 2016/0258764 A1* | 9/2016 | Phuyal | G01C 21/26 |
| 2016/0283920 A1* | 9/2016 | Fisher | G06Q 20/02 |
| 2017/0097715 A1* | 4/2017 | Kim | G06F 3/0488 |
| 2018/0113880 A1* | 4/2018 | Metcalf-Putnam | |
| | | | G01C 21/3691 |

* cited by examiner

CROSS VERIFICATION OF DATA CAPTURED BY A CONSUMER ELECTRONIC DEVICE

CROSS VERIFICATION OF DATA CAPTURED BY A CONSUMER ELECTRONIC DEVICE

This non-provisional application claims priority to Provisional Application No. 62/442,825, filed on Jan. 5, 2017, which is incorporated herein by reference in its entirety.

The present invention relates to a system and method for verifying the accuracy of metadata attached to primary data captured by a capture device. For example, primary data could be a photograph, sound recording or video recording captured by a consumer electronic device such as a mobile telephone. The metadata may relate to the time and/or location of the capture.

BACKGROUND TO THE INVENTION

It is now common for modern mobile telephones to include a camera for capturing stills and video, and a microphone for capturing sound recordings, either as a sound channel to a video recording or a separate sound recording.

Known devices, as well as recording primary data (e.g. a photograph or a video), also record metadata relating to the capture. For example, when capturing a photograph, many devices will store the current time and date, and coordinates of the physical location of the device when the photograph was captured.

In most cases, this metadata is a convenient feature which is useful to a consumer so that he can view and share his photographs (for example) based on where and when they were taken, without the need to make notes and organise the captured pictures manually. However, in some cases verifying that the time and place attached to a particular photograph is accurate may be critical.

News organisations often receive submitted photographs and videos from members of the public, but these organisations have to be careful to verify the authenticity of what they are being presented with—in particular that the photograph (for example) really was taken at the time and place claimed. In the past, even reputable news organisations have fallen victim to falsified submitted photographs and published them as genuine.

There are generally no safeguards against false attribution of time and place to a photograph on known devices. Even if a mechanism exists to ensure that the current GPS location of the device is stored with the photograph, and even if there is a mechanism to prevent later tampering with that location metadata, it is known that GPS transmissions can be "spoofed" by an external transmitter, to cause a GPS receiver to report an incorrect location.

It is an object of the present invention to provide means by which the integrity of metadata attached to primary data by a consumer electronic device may be verified with various levels of confidence.

SUMMARY OF THE INVENTION

According to the present invention, there is provided a system for attributing a confidence level to time and location metadata associated with primary data, the system including a plurality of mobile capture devices and a mobile data communication network allowing data transfer between the mobile capture devices, each mobile capture device including at least one sensor for capturing primary data, and being adapted to provide metadata specifying at least the time and location relating to captured primary data, and each mobile capture device further including at least one further sensor for measuring at least one environmental parameter, each mobile capture device being adapted to carry out the steps of:
  capturing primary data using the at least one sensor;
  associating metadata with the primary data, the metadata specifying at least the time and location of the capture; and
  measuring and storing at least one environmental parameter at the time and location of the capture, and associating the measured environmental parameter with the primary data,
  in response to a trigger, and each mobile capture device being adapted to carry out the steps of:
  measuring and storing at least one environmental parameter; and
  transmitting the measured environmental parameter on the communication network,
  in response to a remote command, and the system including at least one device connected to the data communication network and being adapted to:
  in response to a capture of primary data being made by a mobile capture device forming part of the system, carry out the steps of:
    identifying other mobile capture devices in a similar location at a similar time to the capture device making the primary data capture;
    requesting and receiving environmental data from other mobile capture devices identified;
    comparing environmental data received from other mobile capture devices with the environmental data measured by the device capturing the primary data, and assigning a confidence level to the time and location metadata associated with the primary data based on the comparison.

The environmental data could be one or more of, for example, temperature, humidity, barometric pressure, light level, etc. Environmental data could also include for example visible WiFi networks and cell towers. By comparing environmental data measured by the device capturing, for example, a photograph, with environmental data captured by other devices in a similar location at a similar time, the location metadata attached to the photograph by the capturing device can be given a confidence score.

A capture device responds to a trigger (for example a user command) by taking (for example) a photograph and recording time and location metadata. The time is typically taken from an internal clock on the capture device, which is synchronised at intervals with a network time server. The position information is usually taken from for example a GPS or GLONASS receiver on the device.

When a capture is made by a particular device, this triggers action in other parts of the system. In particular, other nearby capture devices will measure and report environmental data for the purposes of comparison. The users/owners of these other nearby devices do not need to take any action, and in most cases do not even need to be specifically aware that environmental data is being captured and reported at a particular time, provided that they have previously consented to the collection of data, and provided that the data collected is suitably anonymised so that it cannot be linked back to a particular user. The trigger may be a direct user command on the capture device, or alternatively devices could be set on timed triggers, for example to take a photograph every hour, or in response to a motion sensor, or any other trigger.

The device which identifies other nearby devices and makes comparisons could be a server device, or alternatively could be a capture device—either the same capture device capturing the relevant primary data or a different capture device in the system. Depending on the wider context of the system and the trust model, it may be acceptable for the same capture device to play a close role in verifying its own data, in cases where the problem being addressed is specifically external devices fooling a capture device into reporting an inaccurate location, rather than untrustworthy capture devices.

Each mobile capture device may be in the form of a modern mobile telephone, including in particular a processor, and running application software to cause it to carry out the steps required by the system of the invention.

The confidence level in some embodiments may be a binary value indicating either that some confidence threshold has been met or not, i.e. that the time and location metadata attached to the primary data is either verified or not, or alternatively in other embodiments a numeric value or other multi-level output may be provided, indicating the level of confidence in the time and location metadata.

Other devices may be identified within a similar location, for example a radius of one mile, to provide data for cross-verification. In urban areas, there may be a large number of devices very close by, for example within a few hundred metres. In less-populated areas there are likely to be fewer other devices and the range may need to be extended. A "similar location" may therefore be defined dynamically—only very close devices might be used where the area is densely populated with many devices, whereas in a less populated area a "similar location" may include devices further away.

For a particular comparison of an environmental parameter x being made with another device which is a distance of δp away, a condition $$\frac{\delta x}{\delta p} < \text{Max}$$

may be checked to provide a binary answer. If the difference in the environmental parameter δx divided by the distance between the devices is less than a threshold, then that particular cross-verification is successful—the environmental data collected by the capturing device is said to be consistent with environmental data collected by another nearby device.

In some embodiments, there may also be a difference in time between measurements of environmental data on different devices. In that case the time difference δt can also be accounted for in the comparison. However, it is preferable for time differences to be very small if possible. This is achieved by requesting environmental data from other devices for comparison immediately when a capture is made. In some embodiments, the user could even trigger this information to be requested from other devices in advance, and receive feedback when the capture device in use is able to produce a "verified location", and then choose to take a photograph. Otherwise, the environmental data from other devices should be obtained as soon as possible after a capture is made. In cases where there is no network connectivity available at the time of capture, environmental data from other devices might be delayed, but any significant delay can be taken account of and will reduce the confidence level of the location data.

If a numeric or multi-level, rather than binary answer is required, then instead of comparing with a threshold the ratio $$\frac{\delta x}{\delta p}$$

can be used as a confidence score, or as an input to further functions used to calculate a confidence score.

In preferred embodiments multiple different environmental parameters may be used. In that case, for a particular comparison with another device the difference in a weighted sum of two or more parameters over the difference in distance may be used:

$$\frac{\delta\left(\frac{ax + by \ldots + nz}{N}\right)}{\delta p}$$

In this example, each parameter x, y ..., z may be given a different weight a, b ... n. The weighted sums in each position are differenced and then divided by the difference in position. Again, the result of this can be compared to a threshold to provide a binary answer, or may be used in conjunction with further functions to provide a numeric or multi-level answer.

Where multiple other devices have reported environmental data, the single- or multi-parameter ratio may be calculated between the capturing device and each other device. The results may then be combined in various ways. For example, in some embodiments the condition $$\frac{\delta x}{\delta p} < \text{Max or } \frac{\delta\left(\frac{ax + by \ldots + nz}{N}\right)}{\delta p} < \text{Max}$$

might have to be met for every other comparison with every other device in order to declare the position as verified. In other embodiments a threshold, for example 80% of devices having consistent data, may be enough. In yet other embodiments a numeric or multi-level confidence score may be derived from the absolute number or proportion of other devices which have consistent environmental data.

Different devices forming part of the same system may have different hardware sensors and different capabilities. Comparisons can be made with sets of environmental parameters which are common to both devices. For example, if one device can measure temperature, light level and pressure and another device can measure temperature, light level and humidity, then a comparison involving data from these two devices could use temperature and light level but not humidity or pressure.

These conditions assume that the environmental parameters reported by devices are numeric. Many relevant parameters are numeric data, for example temperature, barometric pressure, light level etc. However, some embodiments may use more complex data, for example WiFi networks and/or cell towers seen in the area. Different types of comparisons may therefore be needed to handle this type of data. For example, devices could report lists of 'visible' WiFi networks. From these lists three numbers can immediately be derived—number of networks seen only by device a, number of networks seen only by device b, and number of networks seen by both devices. Where the devices report a location closer than a certain threshold (for example a few tens of meters), a high number of networks seen by both devices when compared to the number of networks seen only by one device may be an indicator of high confidence in the location.

In addition to cross-verifying with data from other devices in the system, certain data may be compared with third-party data sources. For example, the OpenCellID database provides information about cell towers and WiFi networks corresponding with locations. By comparing the cell towers and/or WiFi networks seen by the capturing device (or even by another nearby device forming part of the same system) with reference data from a trusted third party data source, a further level of confidence may be achieved.

As another example, GPS data provides not only two-dimensional position (i.e. latitude and longitude) but also elevation. The combination of latitude, longitude and elevation can be compared to third party mapping data to further increase confidence. If the GPS position is recording for example an elevation of just 50 m above sea level but mapping data shows that the two-dimensional position is in a mountain range, then the purported location may be unreliable.

As a further example, certain environmental data collected by the capturing device can be compared with the purported location data by making use of known relationships. For example, GPS position may indicate a particular elevation, and as described above this may correspond with the two dimensional GPS position and mapping data. Where the capture device includes a pressure sensor, the pressure measured by the pressure sensor may be used to calculate an estimated height, which may also be compared to the measured/mapped position. The following formula may be used to estimate the height from a pressure reading:

$$h = \frac{273.15 + T_0}{0.0065}\left(1 - \left(\frac{P}{P_0}\right)^{\frac{1}{5.255}}\right)$$

Where $T_0$ is standard temperature (15° C.) and $P_0$ is reference pressure (1013.25 hPa). P is the measured pressure and h is the estimated height.

DESCRIPTION OF THE DRAWINGS

For a better understanding of the present invention, and to show more clearly how it may be carried into effect, preferred embodiments will now be described with reference to the accompanying drawings, in which.

DESCRIPTION OF THE PREFERRED EMBODIMENT

Figure 1:
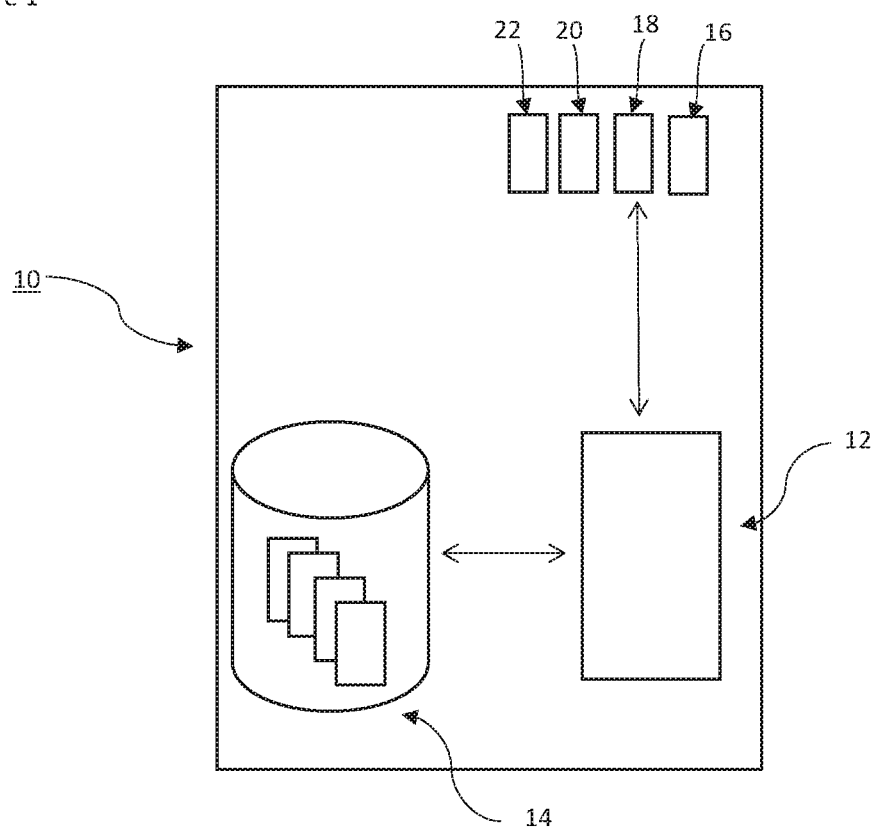
FIG. 1 shows an outline schematic of a mobile capture device forming part of the system of the invention.

Referring firstly to FIG. 1, a mobile smartphone is indicated at 10. The smartphone is a mobile capture device in the system of the invention. Different models of smartphone of course have different features, but critical to the system of the invention are that the smartphone 10 includes a processor 12, data storage 14, at least one sensor for capturing primary data (for example a camera 16 and a microphone 18), a positioning system (for example a GPS receiver 20) and at least one sensor for measuring an environmental parameter, for example a pressure sensor 22.

Figure 2:
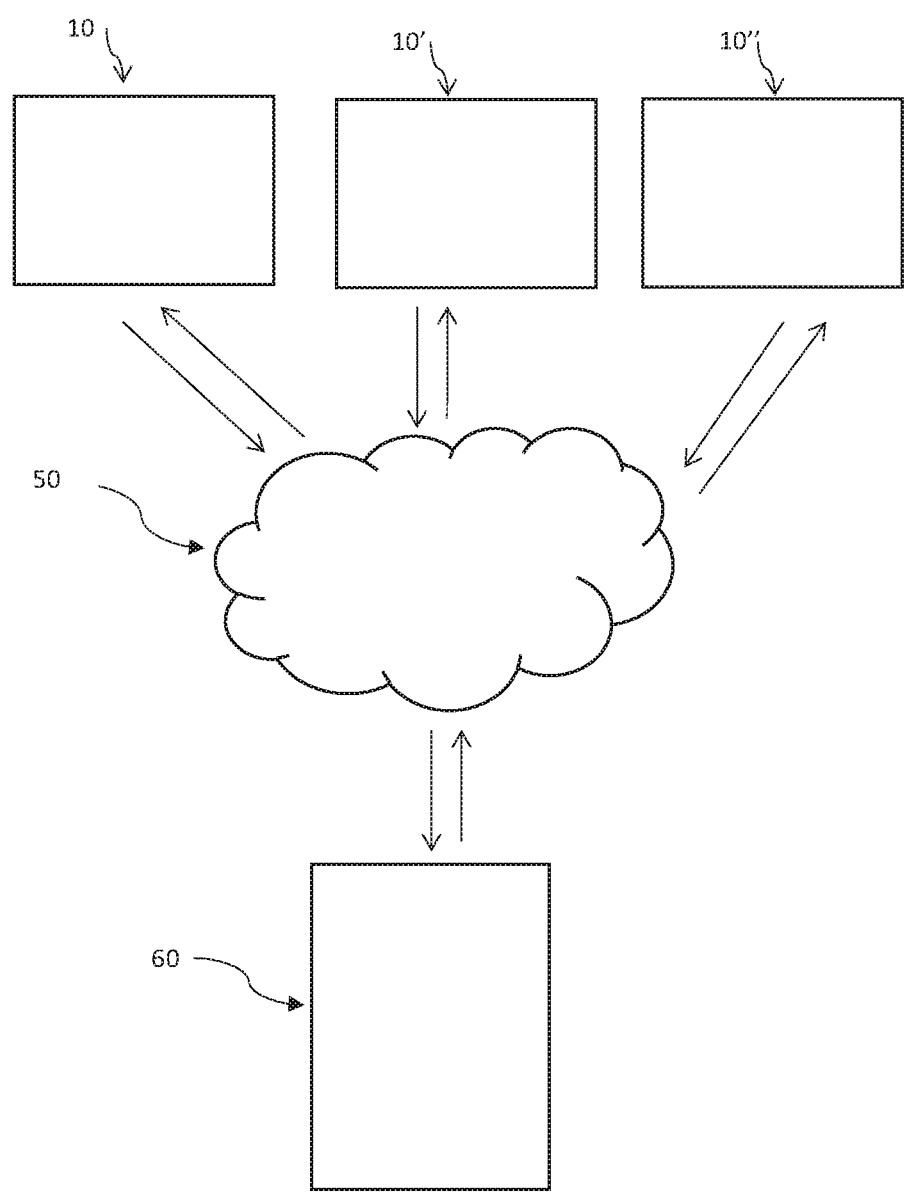
FIG. 2 shows an outline schematic of an embodiment of the system of the invention.

In FIG. 2, an overview of a whole system is shown in outline. The system 100 includes multiple mobile capture devices 10, 10',10". In most embodiments, each mobile capture device 10 would be a mobile smartphone conforming to at least a minimum specification. Each capture device 10 in the system could therefore include slightly different hardware components and capabilities. All of the mobile capture devices are connected to a data communications network 50. The network 50 is not described in detail but in most embodiments will be a complex network or internetwork including multiple components. All devices connected to the network can communicate with each other.

A server device 60 is shown as a separate device, also connected to the network. There is no reason in principle why one or more of the mobile capture devices 10 could not perform the role of the server device, but in this embodiment a dedicated device is illustrated.

Figure 3:
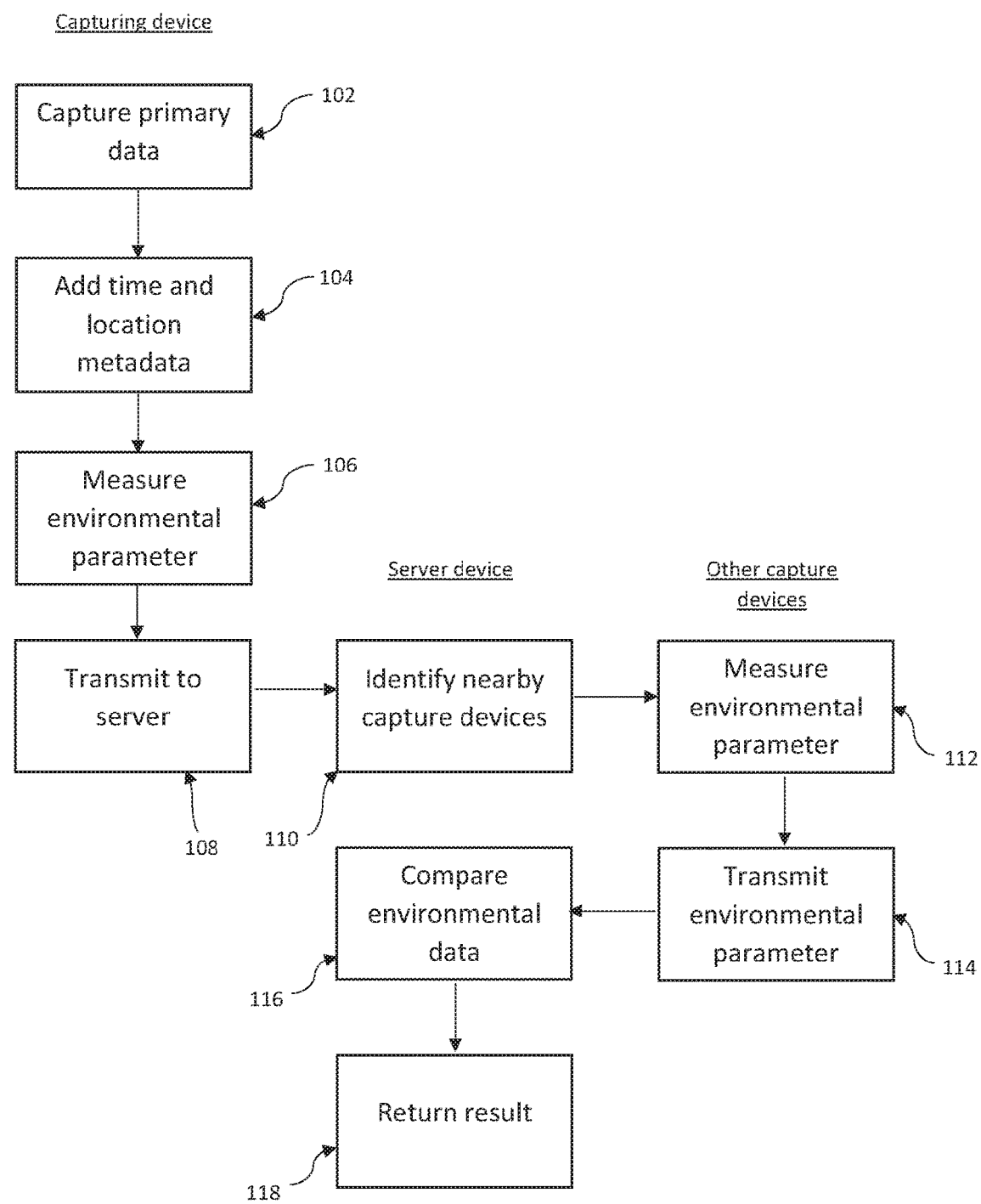
FIG. 3 is a flow chart showing the processes carried out by various components of the system of the invention.

Referring now to FIG. 3, the process of creating and verifying primary data with associated time and location metadata is illustrated. Note that this process involves actions on the "capturing device" 10, and "other capture devices" 10',10". The term "capturing device" is used to mean one of the mobile capture devices in the system which is currently being used to capture primary data (e.g. take a photograph). Any of the mobile capture devices at any time may take this role, normally in response to a user command or other trigger.

At step 102 the capturing device 10 captures primary data. This is typically in response to a user command but in some embodiments another trigger, for example a time trigger, a motion sensor or a remote trigger might set off the process on the capturing device. Capturing primary data typically means taking a photograph, or making a video recording or a sound recording. The primary data is stored by the capturing device 10 in data storage 14.

At step 104 time and location metadata is associated with the primary data. The time typically comes from an internal clock on the capturing device 10, and the location from the GPS receiver 20. Associating the metadata with the primary data can be done by embedding it into the primary data file, associating it in a database, etc. In some embodiments cryptographic techniques may be used to bind the primary data and metadata together and prevent tampering. Various other security safeguards may be built into the device to attempt to ensure that the time and location metadata is difficult to tamper with or "spoof".

Where the primary data is a video or sound recording, i.e. data which is captured over a period of time, it may be desirable to repeat step 104 at intervals, since it is possible for the capturing device 10 to move significantly during a long recording.

At step 106 an environmental parameter is measured by the capturing device 10. This parameter could be for example the barometric pressure which is measured by the pressure sensor 22 on the capturing device. In most embodiments, most of the mobile capture devices in the system will have multiple sensors for measuring different environmental parameters, and the capturing device will measure as many environmental parameters as it can. Environmental parameters could be for example temperature, light level, barometric pressure, WiFi networks visible, cell towers visible, etc.

At step 108 a message is transmitted to the server device 60. In this embodiment a server device 60 has a role in co-ordinating the process, but a decentralised embodiment is also envisaged. The message transmitted to the server at step 108 includes the position of the capturing device, and triggers the process of cross-verification. The server 60 takes the transmitted position and identifies nearby other mobile capture devices 10',10" at step 110. In some embodiments the server may constantly keep track of the positions of all devices in the system, in other embodiments nearby devices may be identified by broadcasting a message to all devices on the system and requesting replies from those close to a particular position. The server may start by trying to identify devices very close (say within a few tens of metres) to the position of the capturing device 10, but in rural or sparsely-populated areas the server may have to expand the search range to find devices. The server 60 must also identify other devices which are compatible with the capturing device 10, in the sense that to provide useful cross-verification information, devices must be able to measure at least one environmental parameter in common with the capturing device. Of course, in embodiments where visible cell towers and/or WiFi networks are used as environmental parameters, almost all devices will be compatible at least to this extent.

Once compatible devices in a suitable area have been identified, the server transmits a message to those devices requesting measurements of environmental parameters. At step 112 each other device measures the requested environmental parameters, and at step 114 the measured parameters are transmitted back to the server 60. If the server device does not already have it, a precise position (typically obtained from a GPS receiver on each device) is also transmitted back to the server 60.

At step 116 the server compares environmental data. This could be by the weighted sum method described in more detail above—the server determines the result of:

$$\frac{\delta\left(\frac{ax+by\ldots+nz}{N}\right)}{\delta p} < \text{Max}$$

and if the difference in the weighted sum over the difference in position is less than a threshold for a particular comparison between data from the capturing device and data from another device, then that other device is effectively in agreement with the capturing device. A confidence level may be assigned depending on, for example, the number of other devices which are in agreement.

At step 118 a result is returned. In different embodiments this result may be transmitted back to the capturing device 10, stored in a database, embedded in the primary data with cryptographic safeguards, etc. The result may simply be a binary "verified" or "unverified" depending on whether threshold conditions for the consistency of data have been met. Alternatively a numeric or multi-level result may be calculated in different embodiments.

The system of the invention preferably forms part of a wider system for creating verifiable data. Such a system should contain security safeguards to prevent tampering with data and ensure devices can be trusted. An example of such a system is disclosed in the Applicant's co-pending application number PCT/IB2018/050036 filed on 3 Jan. 2018.

The system of the invention allows for confidence in time and position metadata which is attached to, for example, a photograph. Where the position information attached to a photograph is shown to have been verified by the system of the invention, an increased level of confidence can be given to that information, because the system of the invention makes it very difficult to attach false metadata and have that metadata verified, since to do so would involve compromising a large number of third party devices.

The embodiment described is by way of example only. The invention is defined in the claims.

The invention claimed is:

1. A system for attributing a confidence level to time and location metadata associated with primary data, the system including a plurality of mobile capture devices and a mobile data communication network allowing data transfer between the mobile capture devices,
   each mobile capture device including at least one sensor capturing primary data, and providing metadata specifying at least the time and location relating to captured primary data, and each mobile capture device further including at least one further sensor measuring at least one environmental parameter,
   each mobile capture device carrying out the steps of:
     capturing primary data using the at least one sensor;
     associating metadata with the primary data, the metadata specifying at least the time and location of the capture; and
     measuring and storing at least one environmental parameter at the time and location of the capture, and associating the measured environmental parameter with the primary data,
   in response to a first trigger,
   and each mobile capture device carrying out the steps of:
     measuring and storing at least one environmental parameter; and
     transmitting the measured environmental parameter on the communication network,
   in response to a second trigger,
   and the system including at least one device connected to the data communication network and,
   in response to a capture of primary data being made by a mobile capture device forming part of the system, carrying out the steps of:
     identifying other mobile capture devices in a similar location at a similar time to the capture device making the primary data capture;
     requesting and receiving environmental data from other mobile capture devices identified;
     comparing environmental data received from other mobile capture devices with the environmental data measured by the device capturing the primary data, and
     assigning a confidence level to the time and location metadata associated with the primary data based on the comparison,
   wherein the confidence level is binary or multi-level, wherein the binary confidence level is calculated by:

$$\frac{\delta\left(\frac{ax+by\ldots+nz}{N}\right)}{\delta p} < \text{Max}$$

where x, y ... z are different environmental parameters, a, b ... n are weights applied to the parameters, N is the number of parameters, δp is the difference in the position of the two devices, and Max is a threshold, and where a "verified" value is returned if the weighted sum is less than Max, otherwise an "unverified" value is returned, and wherein the multi-level confidence level is calculated by:

$$\frac{\delta\left(\frac{ax+by\ldots+nz}{N}\right)}{\delta p}$$

where x, y ... z are different environmental parameters, a, b ... n are weights applied to the parameters, N is the number of parameters and δp is the difference in the position of the two devices, a low value of the ratio $$\frac{\delta\left(\frac{ax+by\ldots+nz}{N}\right)}{\delta p}$$

indicates a high confidence, and vice versa.

2. The system as claimed in claim 1, in which the at least one sensor for measuring an environmental parameter includes at least one of a thermometer, a hydrometer, a pressure sensor, a light level sensor.

3. The system as claimed in claim 1, in which the at least one sensor for measuring an environmental parameter includes at least one of a WiFi transceiver for detecting visible WiFi networks and a mobile telecommunications transceiver for detecting visible cell towers.

4. The system as claimed in claim 1, in which the device which identifies other nearby devices and makes comparisons is a server device.

5. The system as claimed in claim 1, in which the device which identifies other nearby devices and makes comparisons is also a mobile capture device.

6. The system as claimed in claim 1, in which each mobile capture device is a mobile telephone, including a processor and a computer program for execution on the processor.

7. The system as claimed in claim 1, in which the confidence level output by the system is a binary "verified" or "unverified" value.

8. The system as claimed in claim 1, in which the binary confidence level is calculated by:

$$\frac{\delta x}{\delta p} < \text{Max}$$

where δx is the difference in an environmental parameter measured by two devices, and δp is the difference in the position of the two devices and Max is a threshold, and where a "verified" value is returned if $$\frac{\delta x}{\delta p}$$

is less than Max, otherwise an "unverified" value is returned.

9. The system as claimed in claim 1, in which the multi-level confidence level is calculated by:

$$\frac{\delta x}{\delta p}$$

where δx is the difference in an environmental parameter measured by two devices, and δp is the difference in the position of the two devices, and a low value of the ratio $$\frac{\delta x}{\delta p}$$

indicates a high confidence, and vice versa.

10. The system as claimed in claim 1, in which the maximum difference in position δp which determines a device to be in a "similar location" is variable according to the density of devices in the relevant area.

11. The system as claimed in claim 1, in which environmental data for a particular position is compared to a third party data source.

12. The system as claimed in claim 11, in which visible WiFi networks and/or visible cell towers are compared to the third party data source.

13. The system as claimed in claim 1, in which a position including elevation is compared to third party mapping data.

14. The system as claimed in claim 1, in which a position including elevation is compared to an estimated elevation determined from a pressure sensor.

15. The system as claimed in claim 14, in which the estimated elevation is determined according to:

$$h = \frac{273.15 + T_0}{0.0065}\left(1 - \left(\frac{P}{P_0}\right)^{\frac{1}{5.255}}\right).$$

* * * * *